Aug. 4, 1936. J. LUTON 2,049,967
APPARATUS FOR MAKING MOLDS
Filed July 25, 1933 2 Sheets-Sheet 2
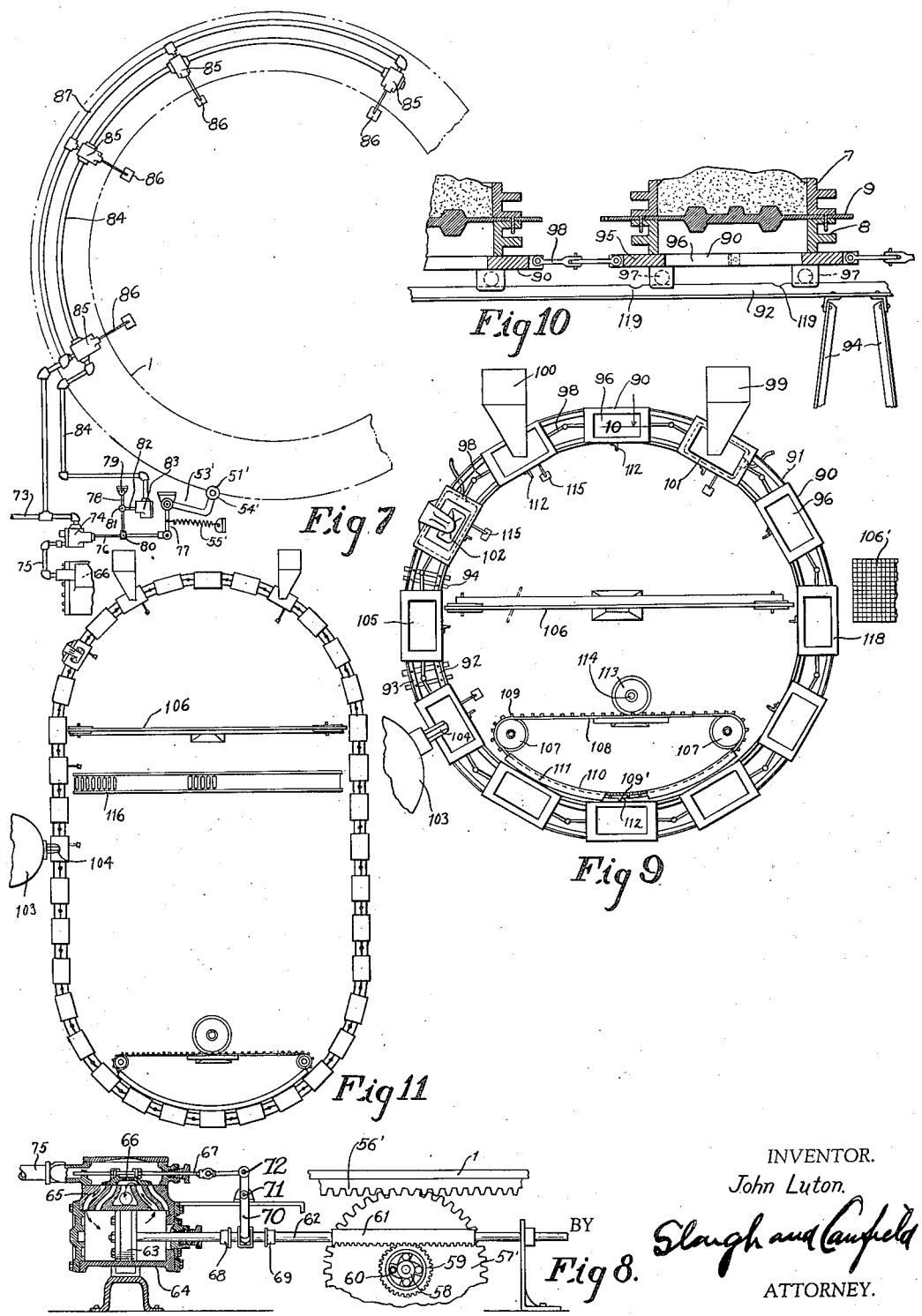
INVENTOR.
John Luton.
BY Slaugh and Canfield
ATTORNEY.

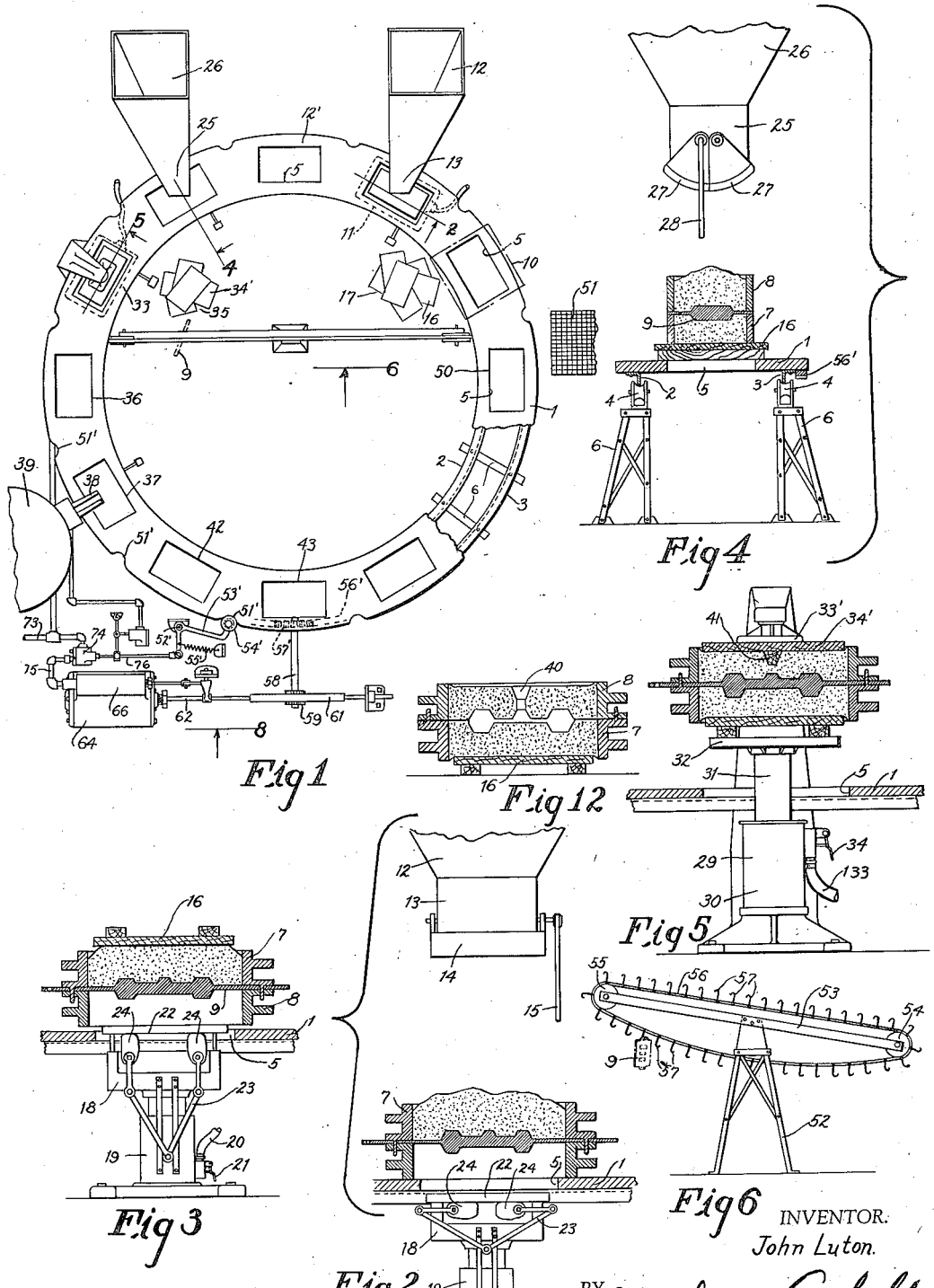

Patented Aug. 4, 1936

2,049,967

UNITED STATES PATENT OFFICE 2,049,967

APPARATUS FOR MAKING MOLDS

John Luton, Cleveland Heights, Ohio, assignor to Consolidated Iron-Steel Mfg. Company of 1932, Cleveland, Ohio, a corporation of Ohio Application July 25, 1933, Serial No. 682,139

3 Claims. (Cl. 22—21)

This invention relates to the art of founding and particularly to methods and apparatus for making molds of sand or the like, and to casting the molds in metal.

It is one of the objects of this invention to provide an apparatus and method for producing molds by which a saving in time and/or in the labor costs thereof as compared to prior methods and apparatus may be effected.

Another object is to provide an apparatus and method for producing molds in which a division of labor may be effected, the necessary operations to produce the molds being divided among a plurality of laborers instead of all being performed successively by a single laborer.

Another object is to provide an apparatus and method for producing molds wherein molds may be produced in a relatively unskilled labor, or labor less skilled than has heretofore been necessary.

Another object is to provide an apparatus and method for producing molds whereby the making of molds may be carried on in a continuously repeating cycle of operations from a plurality of patterns.

Another object is to provide a method and apparatus for producing molds of the general class in which patterns and flasks are circulated around a closed pathway through a succession of stations at which different successive mold making operations are performed, and in which the timing of the several mold making operations may be effected in an improved manner.

Another object is to provide a method and apparatus for making molds of the general class referred to and in which the times required to perform the several mold making operations may be equalized.

Another object is to provide a method and apparatus of the general class referred to in which the circulating flasks, when the molds have been finished therein, may be cast with molten metal on their return to the beginning of the mold making operations.

Another object is to provide a method and apparatus for producing molds and casting them in metal and wherein the making of the molds may be carried on in a continuously repeating cycle of operations from a plurality of patterns.

Another object is to provide an improved method and apparatus for circulating molding flasks and patterns through a continuous cycle of mold producing and mold casting operations.

Other objects will be apparent to those skilled in the art to which my invention pertains.

My invention is fully disclosed in the following description taken in connection with the accompanying drawings, and in which:

Fig. 1 is a plan view, in some respects diagrammatic, of an apparatus embodying my invention in one form;

Fig. 2 is a sectional view, to an enlarged scale, taken from the plane 2 of Fig. 1;

Fig. 3 is a view similar to Fig. 2 with parts thereof in different positions.

Fig. 4 is a sectional view, to an enlarged scale, taken from the plane 4 of Fig. 1;

Fig. 5 is a sectional view, to an enlarged scale, taken from the plane 5 of Fig. 1;

Fig. 6 is an elevational view taken from the plane 6 of Fig. 1;

Fig. 7 is a plan view, illustrating some of the parts of Fig. 1 which, in that figure, are concealed behind other parts;

Fig. 8 is a view, partly sectional, to an enlarged scale taken from the plane 8 of Fig. 1;

Fig. 9 is a view, generally similar to Fig. 1, illustrating a modification;

Fig. 10 is a sectional view, to an enlarged scale, taken from the plane 10 of Fig. 9;

Fig. 11 is a view, generally similar to Fig. 9, but illustrating a further modification;

Fig. 12 is a sectional view of a finished mold which may be made in the practice of my invention.

This application is a continuation in part of the subject matter of my copending application, Serial No. 501,844, filed December 12, 1930, for improvements in Methods and apparatus for making molds, and reference thereto may be had for a more complete description of parts briefly described herein.

Referring to the drawings, I have shown at 1 generally, a horizontally disposed annular table mounted to rotate about its center. The rotational mounting comprises an inner rail 2 and an outer rail 3 secured to the underside of the table, and of circular form preferably formed from angle iron having a horizontal flange by which the rails may be secured to the underside of the table and a vertical depending flange serving as a rail proper.

The rails 2 and 3 are supported upon an annular series of wheels or rollers 4—4, supported upon an annular series of inner and outer trestles 6—6.

The table 1 is provided with a plurality of equally spaced openings or perforations 5—5, the size and purpose of which will become presently apparent.

Means will hereafter be described for rotating the table 1 and for indexing it so that its rotary movement will be intermittent and each movement the same predetermined amount.

The further description of the apparatus may best be described in connection with a mode of operation thereof, as follows.

A plurality of flasks comprising each a drag flask 7, a cope flask 8, and a pattern 9 are provided, adapted to be supported on the table 1 and to travel around the circle of the table upon rotation thereof.

The flasks may be considered as starting from a starting point or station, indicated at 10, Fig. 1. From that station the flasks move upon indexing the table 1, to a station 11, Fig. 1, which may be referred to as a jolting station. At this station the flasks and table appear as in Fig. 2. Immediately over the station 11, see Fig. 2, is a sand supplying hopper 12, terminating downwardly in a spout 13 closed by a gate 14 operable by a lever 15. Upon operating the lever 15, sand from the hopper may fall into the drag portion 7 of the flask filling it. The operator, then takes a drag follow-board 16 from a pile or supply of such boards, indicated at 17, and places it on the sand in the drag flask in the position indicated in Fig. 3.

At the station 11 is disposed a jolting machine, illustrated in Figs. 2 and 3, having a jolting head 18 and a cylinder and piston construction, indicated generally at 19, a compressed air supply conduit 20, and a control lever 21.

The jolter mechanism comprising these parts may be of any known or suitable construction, whereby when the valve 21 is operated, the head will be jolted for the well known purpose. A supplemental head 22 is provided on the jolter head 18, which may be raised or lowered by a suitable mechanism indicated generally at 23. The construction involves rigid cam lobes 24—24 rotatively supported upon the head 18 and supporting the supplemental head 22. When the mechanism 23 is operated in one direction, the supplemental head 22 is lowered to the position illustrated in Fig. 2 whereat the table 1 may move thereover, and when operated in the other direction the cam lobes 24 will raise the supplemental head 22 upwardly through the adjacent opening 5, causing it to pick up the flask and elevate it above the table 1, as illustrated in Fig. 3. When the jolting mechanism is then operated to jolt the head 18, the supplemental head 22 will be jolted and jolt the flask and the shock of the jolts will not be transmitted to the table 1.

The mechanism of this general construction is more completely described in the above mentioned application and need not be more fully described here.

After the jolting operation is completed, the head 22 may be lowered to support it upon the supplemental head 18 and the flask will thereby be deposited on the table 1.

The indexing mechanism above referred to and which will be described, stops the table 1 after each intermittent movement to align the opening 5 with the supplemental head 22 of the jolter mechanism, so that it may operate upwardly and downwardly therethrough with clearance, and obviously the sizes of the supplemental head 22 and opening 5 may be proportioned to provide the clearance. Preferably the supplemental head 22 is rectangular and the openings 5 are correspondingly made rectangular, as illustrated in the drawings.

The table is then indexed ahead another step carrying the flask with it to a position indicated by the position of an opening 5 at 12', Fig. 1. At this station the flask may be turned upside down and supported upon the follow-board 16, as shown in Fig. 4, the follow-board being large enough to span the opening 5, and the flask will appear as in Fig. 4. Upon the next movement of the table, the flask will be brought under the spout 25 of another hopper 26, controlled by a gate or gates 27—27 and an operating lever 28.

At this station an operator, upon operating the lever 28, will cause sand to fall into the cope portion of the flask 8, as shown in Fig. 4.

The table is then indexed ahead another step which brings the filled flask to a station, indicated at 33, at which is located a squeezing machine, illustrated generally in Fig. 5 at 29.

The squeezing machine comprises generally a cylinder 30 and a piston 31, and a movable squeezing head 32 on the piston, the head being adapted to move upwardly upon admitting air through an air supply conduit 133, by the operation of a valve 34.

The exact construction of the squeezer mechanism comprises no substantial part of my invention; however, it is desirable that the squeezing head 32 be proportioned to the size of the opening 5 in the table 1 so that it may pass freely upwardly therethrough when the opening 5 is aligned therewith by the above referred to indexing mechanism.

The squeezer machine is also provided with an upper stationary head 33'.

When the flask is first moved to the station 33, of Fig. 5, it appears as in Fig. 4, and before the squeezer head 32 is elevated to squeeze the flask, the operator places thereon a sprue mold board 34', which he takes from a pile of such boards illustrated at 35, Fig. 1.

The operator then operates the valve 34 to raise the head 32 to squeeze the mold between the heads 32 and 33', and after the squeezing operation lowers the head 32 to deposit the flask again upon the table 1.

The table is then indexed to a position indicated by the openings 36, in Fig. 1, carrying the flask with it, and at this station the flask is taken apart and the pattern removed therefrom. The two parts of the flask are then put back together and the mold completed in a well known manner. The mold now appears as in Fig. 12.

Where it is contemplated that my invention is to be used for making molds which are to be poured upon a separate pouring floor, snap flasks will be used and, referring to Fig. 4, the two parts 7 and 8 of the flask may be removed from the mold, leaving it supported upon the drag follow-board 16, and it may then be carried away by an operator and laid upon the pouring floor. In such case, the two parts of the flask 7 and 8 will be laid upon the table 1 and the pattern which has been removed therefrom will be reassembled therewith and in due course the flask and pattern will be rotated around again to the station 10, or starting station, and will start on another cycle of mold making operations.

My invention, however, contemplates pouring the casting, on the table 1, particularly where the castings are small and may solidify in a relatively short time. In such case, the mold as it appears in Fig. 12 is left on the table 1, and as the table is indexed around step by step, the mold arrives at a station indicated at 37. In this position, or at this station, the mold is directly under the spout 38 of a cupola 39, which spout and cupola may be of well known construction in the art, and by well known means, the spout is operated to discharge molten metal into the mold through the sprue mold portion 40 (see Fig. 12), which has been provided in the usual manner in connection with a sprue mold pattern portion 41 (see Fig. 5).

The operation above described of removing the pattern, preparing the sprue mold, and otherwise finishing the mold before the pouring operation which has just been described, are more fully described in the above mentioned copending application.

After the mold has been poured in the station indicated at 37, it moves by successive steps to successive stations, indicated at 42, 43, etc., around to a break up station, indicated at 50.

By this time the casting has solidified and an operator at the station 50 breaks up the mold to remove the casting. This may be performed upon a grate indicated at 51 of well known construction. Having removed the casting and the mold from the flask, it is ready to reassemble with a pattern for another cycle of operation.

The pattern which was removed from the mold at or adjacent the station indicated at 36 is transferred across the annular table by a transfer device, one form of which is illustrated in Figs. 1 and 6. It comprises a pedestal or column 52 supporting an inclined bridge 53, having pulleys 54 and 55 rotatively mounted in the opposite ends thereof, and a belt 56 running over the pulleys provided with a plurality of hook devices 57. The patterns are provided with the suitable perforations adapted to engage the hook devices 57. The pattern 9 is attached to a hook device 57 by an operator adjacent the station 36 and by gravity will rotate the pulleys 55 and 54 and move over to the other side of the circle where it may be taken off of the hook device by an operator at the station 50, and reassembled by him with the two parts of the flask from which the casting has just been removed.

The flask and assembled pattern is then ready for another cycle of operation, and is moved on to the starting station 10.

Where the molds are made and removed from the table, the number of patterns will be the same as the number of flasks, one pattern for each flask, but where the molds are poured on the table, a fewer number of patterns will be required than the number of flasks inasmuch as some of the flasks are occupied on that portion of the table with which they move, while the castings are solidifying.

Any suitable number of operators may be disposed inside or outside of the circle of movement of the flasks and patterns and molds. The location of operators is more fully discussed in the description of a generally similar system in the above mentioned pending application.

In any case it will be found that the number of operators required is smaller where the pattern and flask move from station to station for the performance of different operations, than where a single operator performs all of the operations of making a mold.

As will now be apparent, a flask associated with each of the openings 5 moves therewith around a circular path of movement upon rotation of the table 1, and in connection with the pattern associated with each flask, successive steps in mold making operations are performed upon the flask at successive stations in the circular path of movement, finally completing the mold and returning the flask to the starting point to repeat the cycle, and the pattern may stay with the flask when the system is operated to remove the mold to a separate pouring floor, or the pattern may have a shorter path of movement and be transferred across the circular path to be associated with a different flask where the system is operated to pour the finished mold in the flask on the rotating table.

The means above referred to for moving the table intermittently with an indexed movement will now be described.

In the outer peripheral edge of the table 1, it is provided with a plurality of equally spaced notches 51'—51'. A bell crank lever pivoted to a stationary support at 52' has on the end of one arm 53' a roller 54', and a spring 55' connected to the other arm of the bell crank lever constrains it to rock counter-clockwise to hold the roller 54' resiliently against the table edge. The roller and notch function as centering means to accurately position the table when it has been moved ahead to approximately the desired position, or to a position in which the roller 54' may roll down into the notch 51'.

A large annular gear 56' is secured to the underside of the table (see Fig. 8), and has meshed therewith a driving gear 57' secured upon one end of a shaft 58 upon the other end of which a pinion 59 is mounted, adapted to engage the shaft to rotate it in one direction only, through a ball clutch device 60 on the shaft. The clutch device 60 may be of any suitable construction whereby when the pinion 59 is rotated clockwise as viewed in Fig. 8, it will engage and rotate the shaft, and when rotated in the opposite direction will rotate freely on the shaft.

The pinion 59 is meshed with a rack 61 mounted for reciprocation and connected to the piston rod 62 of a piston 63, in a pneumatic cylinder 64.

Upon admission of compressed air to the cylinder 64, in a manner to be described, the piston 63 may be propelled toward the right, as viewed in Fig. 8, moving the rack 61, turning the pinion 59 clockwise, causing the clutch 60 to engage the shaft 58 and turn the gear 57 and advancing the table by the gear 56 meshed with the gear 57. Upon admitting air to the other side of the piston 63, the rack 61 will move toward the left as viewed in Fig. 8, and the pinion 59 will move idly on the shaft 58, due to the action of the one-way clutch 60.

To control admission of air to the cylinder 64, a valve device, shown generally at 65, operable by a slide valve 66, may be employed. A valve rod 67 is provided to operate the valve 66.

The valve parts thus briefly described constitute no essential part of my invention, and may be of any known or suitable construction, well known in the art. It is believed sufficient here to say that upon moving the valve rod 67 toward the right as viewed in Fig. 8, air will be admitted to the left hand side of the piston 63 and it will move toward the right and at or adjacent its stroke, if the rod 67 is moved in the opposite direction, it will admit air to the right hand side of the piston and exhaust air from the left side of the piston, and so on.

A pair of abutments 68 and 69 are provided on the rod 62, and a lever 70 pivotally mounted upon a stationary point 71 has one end disposed between the abutments 68 and 69, and the other end pivotally connected as at 72 to the rod 67.

Thus, when the piston 63 reaches a point near the right hand end of the stroke, the abutment 68 will rock the lever 70 and move the rod 67 toward the left, and vice versa upon the return stroke of the piston.

Thus, normally, the piston 63 will reciprocate back and forth continuously.

By means which will now be described, the air to the piston is controlled to cause it to make one complete stroke and stop starting from the right hand end of the cylinder, thus moving the table 1 ahead one step and returning preparatory for the next step.

Referring to Figs. 1 and 7, air is supplied from a source through a conduit 73 and communicates with a valve 74 controlling the conduit 75 leading to the cylinder valve mechanism 66. The valve 74 is controlled to be opened by movement toward the left of a valve rod 76 communicating at one end with the interior of the valve device 74, and at its opposite end with an arm 77 of the bell crank device referred to. An arm 78 pivotally connected at one end to a stationary support at 79, and at its opposite end connected to the valve rod 76, has at 80 and at an intermediate portion, as at 81, connected to a piston rod 82 associated with a cylinder 83 and a piston therein not shown. A branch conduit 84 is connected to the piston 83 and is carried around under or adjacent to the table 1, and is provided with a plurality of valve devices 85—85, serially disposed and controlling in series relation flow through the conduit 84, the valve devices 85 having pedal or like operating levers 86—86 disposed convenient to operators located at several of the stations at which mold making operations are made as hereinbefore described. The conduit 84 and all of the valve devices 85 in series are supplied by a conduit 87, connected to the supply conduit 73.

In operation of the compressed air supply control, it is assumed that the piston 63 of the cylinder is at its right hand extreme position, with the rack 61 in forward position. At this time the roller 54' is in one of the notches 51' of the table, and disposes the latter accurately for cooperation with the molding machines, etc., hereinbefore referred to.

When the time has come to step the table ahead one step, the operators will all have finished their various operations and each one when finishing his work presses down his lever 86, opening his valve. When the last operator has opened his valve then, and not before, air may pass through the conduit 87 from the supply 73, through all of the valve devices and the conduit 84 to the cylinder 83. The rod 82 is thereby moved toward the left rocking the lever 78 clockwise, moving the valve rod 76 toward the left. The movement of this latter rod withdraws the roller 54' from the notch 51' through the action of the bell crank levers 77 and 53' against the tension of the spring 55' and simultaneously opens the valve 74. Air is thereby admitted to the valve device 66 and into the cylinder 64 moving the piston 63 toward the left to retract the rack 61. As soon as the piston reaches the end of the stroke, the valve device 66 is thereby reversed and the piston moves back again toward the right, and through the rack 61, pinion 59, and gears 57' and 56' moves the table 1 counter-clockwise, as viewed in Figs. 1 and 7. As soon as the table begins to move, the operators move their hands or feet from their valve levers 86, which shuts off the supply of air to the piston 83, but this does not shut off the supply of air to the valve 74 because the roller 54' is now out of the notch 51' and rolling along the outer periphery of the table 1, and thus, due to the clockwise positions of the bell crank levers 53' and 77 against the tension of the spring 55', the valve rod 76 is held in the position to hold the valve 74 open. Air thus is continuously supplied to the piston 63 and moves it to its full stroke toward the right. At approximately the time the piston reaches the right hand end of its stroke, the table has been advanced to bring another notch 51' under the roller 54' and the roller drops thereinto which not only actually centers the table at its exact index step, but, due to the action of the spring 55', the rod 76 is retracted, closing the valve 74 and shutting off the supply of air to the piston 63.

The parts are then in position to repeat this cycle when the operators again depress all of the valve operating levers 86—86.

It will now be apparent that not only is the table indexed ahead a step at a time exactly the same amount each step, but that there is no danger that it may be stepped ahead while one of the operators is still at work.

The making of molds may thus be effected in the minimum of time. If one operator is always the last to release the table, for indexing, he may be replaced with a more rapid operator; or if one operation delays the indexing movement, this operation may be speeded up or subdivided between two operators.

In the modification of my invention illustrated in Figs. 9 and 10, instead of employing a table, indexed ahead step by step, I employ a plurality of carriages 90—90 indexed ahead step by step on a stationary trackway 91.

The trackway 91 comprises inner and outer rails 92 and 93, circular in form, and supported on a plurality of annularly spaced trestles 94. Each carriage 90 comprises a bed 95 having therethrough an opening 96 corresponding to the opening 5 of the other form described, and the bed is supported on a plurality such as four wheels 97, adapted to run on the rails 92 and 93. The carriages may be provided with flasks comprising a drag flask portion 7, a cope portion 8, and a pattern 9, as described for the other form. The plurality of carriages are coupled together like a train of cars by coupling means 98—98 constituting a closed chain of carriages.

The exact construction of the coupling device 98 forms no essential part of my invention and may be any known or suitable device for this purpose whereby if either carriage is propelled from one station to another along a track it will communicate its movement to all of the other carriages and cause them to move likewise.

At 99 and 100 are hoppers and at 101 and 102, respectively, are shown a jolting machine and a squeezing machine, the construction of which may be identical with the corresponding parts herein described for the first form. The carriages 90 and coupling devices 98 may be proportioned so that the openings 96 therein will be of the same size and spaced apart, identically as the openings 5 of the first form. Furthermore, the rails 92 and 93 may be spaced apart to correspond to the distance between the rails 2 and 3 of the other form.

At 103 is a cupola having a spout 104 which may be similar to or like that of the first form. The operation of this form of my invention thus far described may be substantially identical with that of the first form. The same operations may be performed on the flasks and patterns to make the molds, and the carriages 90 may be indexed ahead from station to station during this process, the jolting machine and the squeezing machine operating their heads upwardly between the rails 92 and 93 of the trackway and upwardly through the openings 96 in the carriages, and it is not believed necesasry to further illustrate or describe this mode of operation.

The mold will be finished substantially at the station indicated at 105, and there the pattern may be removed and transferred across the circular trackway on transfer device 106, which may be the same as that for the other form, and as illustrated in Figs. 1 and 6; and the mold and flask may continue around the trackway and be poured at the spout 104; and after the casting is cooled it may be broken up in connection with the grate 106', and a pattern from the transfer device 106 re-associated with the flask and started around the track for a second time.

Or, if desired, as stated for the first form, the molds may be removed from the circle at the station 105 to be poured on a separate pouring floor and the pattern and two parts of the flask may be reassembled and circulated around to the starting point together.

To step ahead, repeatedly, the carriages of the train, any suitable mechanism may be employed. In Fig. 9, one form is shown. It comprises a pair of spaced sprocket wheels 107—107 over which runs a chain 108 having outwardly extending teeth 109—109. One flight of the chain extends rectilinearly between the wheels 107—107 and the other flight is curved as indicated at 109' by causing it to ride over the web 110 of a channel 111 bent into the form of a circle concentric with the trackway and disposed along the inner side thereof. Each of the carriages 90 is provided with an inwardly extending lug 112. As the carriages move around on the trackway, the lug 112 will be picked up by the teeth 109 and the entire train of carriages will be propelled thereby. As shown in Fig. 9, any suitable number such as three carriages may be engaged by the chain at the same time. To move the chain ahead step at a time a suitable distance each step, any suitable means may be employed. One means is illustrated in Fig. 9 and comprises a relatively large gear 113 mounted on a shaft 114 and the teeth of which engage the teeth 109 of the chain 108.

To move the gear wheel 113 with an intermittent movement always in the same direction and of predetermined rotational amount, the mechanism hereinbefore described in connection with the first form may be employed, the gear 113 and shaft 114 corresponding to the gear 57 and shaft 58 of that form.

At 115—115 are indicated valve lever control devices corresponding to the devices 86 of the other form whereby the indexing ahead of the carriages from station to station may be controlled by the operators.

It will thus be seen that the form of Figs. 9 and 10 operates substantially identically with the other form.

In the form of my invention illustrated in Fig. 11, a construction generally similar to that of Figs. 9 and 10 is shown, but in this form the circular trackway is extended into elliptical form in order that where relatively large castings are poured from the cupola 103 and spout 104, a greater length of time for solidifying will elapse before the carriages with the flasks have been returned to the starting point of the cycle. The patterns may be transferred across from one side of the trackway to the other by the transfer device 106 above described when the apparatus is operated by the system whereby the flask is retained around the mold and travels around the rest of the elliptical trackway to be poured. If, however, it be desired to operate the apparatus by the system in which the snap flasks are removed from the mold and the mold is removed from the trackway and carried to the pouring floor, the flasks may be directly transferred across the elliptical trackway without waiting for them to idly travel all around the same, which latter mode of operation would require a relatively great number of idle flasks. In such case a simple roller-form conveyer, indicated at 116, may be employed upon which the flasks which have been removed from the molds may be laid and transferred directly across to the other side of the trackway where they may be assembled with patterns for another cycle. In such cases, also, if desired, the transfer mechanism 106 may be dispensed with and the flasks, together with the patterns which have been removed therefrom, may be reassembled together and transferred across the trackway on the conveyer 116 for another cycle.

In order to accurately position the carriages at the end of the indexing movement, it will be sufficient to accurately position one of the carriages. This may conveniently be done for the carriage indicated at 118, Fig. 9, by providing in the rails 92 and 93, or in one of the rails, notches or depressions 119, as shown in Fig. 10. If the carriage is indexed approximately to such position, the wheels 97 will roll downwardly into the notches and aid the movement of the carriages to the exact position, or restrain them from moving beyond it. If desired, of course, such notches may be provided at every station to exactly position a carriage at each station.

In my copending application, Serial No. 682,133, filed July 25, 1933, I have shown a mold making series of operations as being performed upon a circular trackway and the finished molds as being transferred to a supplemental or branch conveyor on which they may be poured. Obviously, the circular mold making apparatus of the instant application may be employed in this manner also.

My invention is not limited to the exact details of construction shown and described. Many changes and modifications may be made within the scope and spirit of my invention without sacrificing its advantages.

I claim:

1. In a mold making apparatus, a plurality of flasks and corresponding patterns, a conveying apparatus for conveying the flasks and patterns on a continuous closed pathway from a starting station, to and through a plurality of stations serially disposed along the pathway, for the performance on the flask and pattern of different mold making operations at the different stations, including making the mold, removing the pattern, and returning the flask and pattern to the starting station, the conveying apparatus comprising means for causing the flasks to move in unison, power means for moving the flasks along the pathway, control means operable to control application of power from the power means to effect starting and stopping of the flasks, and a plurality of operable means disposed at a plurality of stations respectively to jointly control operation of the control means.

2. In a mold making apparatus, a plurality of flasks and corresponding patterns, a conveying apparatus for conveying the flasks and patterns on a continuous closed pathway from a starting station, to and through a plurality of stations serially disposed along the pathway, for the performance on the flask and pattern of different mold making operations at the different stations, including making the mold, removing the pattern, and returning the flask and pattern to the starting station, the conveying apparatus comprising means for causing the flasks to move in unison, power means for moving the flasks along the pathway, control means operable to control application of power from the power means to effect starting and stopping of the flasks, and a plurality of operable means disposed at a plurality of stations respectively to jointly control operation of the control means, to start the flasks, and means operable by movement of the flasks to control operation of the control means to stop the flasks at predetermined points in the path of movement.

3. In a mold making apparatus, a plurality of flasks and corresponding patterns, a conveying apparatus for conveying the flasks and patterns on a continuous closed pathway from a starting station, to and through a plurality of stations serially disposed along the pathway, for the performance on the flask and pattern of different mold making operations at the different stations, including making the mold, removing the pattern, and returning the flask and pattern to the starting station, the conveying apparatus comprising means for causing the flasks to move in unison, power means for moving the flasks along the pathway, control means operable to control application of power from the power means to effect starting and stopping of the flasks, and a plurality of operable means disposed at a plurality of stations respectively to jointly control operation of the control means, to start the flasks, and means to control operation of the control means to stop the flasks at predetermined points in the path of movement, responsive to power-effected movement of the flasks along the pathway.

JOHN LUTON.